US007585921B2

(12) United States Patent
Kishiki et al.

(10) Patent No.: US 7,585,921 B2
(45) Date of Patent: Sep. 8, 2009

(54) RESIN FOR TONER BINDER AND TONER COMPOSITION

(75) Inventors: Hiroshi Kishiki, Kyoto (JP); Naoki Takase, Kyoto (JP); Syuji Yamada, Kyoto (JP); Tatsuyoshi Ishii, Kyoto (JP)

(73) Assignee: Sanyo Chemical Industries, Ltd., Kyoto-Shi (JP)

( * ) Notice: Subject to any disclaimer, the term of this patent is extended or adjusted under 35 U.S.C. 154(b) by 364 days.

(21) Appl. No.: 10/498,488

(22) PCT Filed: Dec. 16, 2002

(86) PCT No.: PCT/JP02/13135

§ 371 (c)(1), (2), (4) Date: Nov. 12, 2004

(87) PCT Pub. No.: WO03/052521

PCT Pub. Date: Jun. 26, 2003

(65) Prior Publication Data

US 2005/0064313 A1 Mar. 24, 2005

(30) Foreign Application Priority Data

Dec. 14, 2001 (JP) ............................ 2001-382390
May 21, 2002 (JP) ............................ 2002-146572

(51) Int. Cl.
*C03G 9/00* (2006.01)
*C08L 67/00* (2006.01)

(52) U.S. Cl. ..................... 525/432; 430/109.4; 528/272

(58) Field of Classification Search ................. 525/432; 430/109.4; 528/272
See application file for complete search history.

(56) References Cited

U.S. PATENT DOCUMENTS

| | | | |
|---|---|---|---|
| 3,821,938 A | 7/1974 | Bacon et al. | |
| 5,015,724 A * | 5/1991 | Kawabe | 528/272 |
| 5,057,392 A * | 10/1991 | McCabe et al. | 430/109.2 |
| 5,294,682 A * | 3/1994 | Fukuda et al. | 525/442 |
| 5,750,303 A * | 5/1998 | Inaba et al. | 430/108.4 |
| 6,120,957 A * | 9/2000 | Miyamoto et al. | 430/108.21 |

FOREIGN PATENT DOCUMENTS

| | | |
|---|---|---|
| JP | 60-098444 A | 6/1985 |
| JP | 60098444 A * | 6/1985 |
| JP | 62-215962 | 9/1987 |
| JP | 62-295068 | 12/1987 |
| JP | 09-244299 A | 9/1997 |

(Continued)

OTHER PUBLICATIONS

JP 60-098444, PAJ translation (submitted by applicant) and Derwent translation (XP-002393825 doc submitted by Applicant).*

(Continued)

*Primary Examiner*—Randy Gulakowski
*Assistant Examiner*—Alicia M Toscano
(74) *Attorney, Agent, or Firm*—Westerman, Hattori, Daniels & Adrian, LLP.

(57) ABSTRACT

The present invention provides
a resin for toner binders,
which comprises two polyester resins (A) and (B),
said resin (A) being a crosslinked modified polyester resin consisting of the reaction product from a crosslinked polyester resin (a) and a polyepoxide (c) and
said resin (B) being an acid anhydride-modified linear polyester resin consisting of the reaction product from a linear polyester resin (b) and an acid anhydride (r).

21 Claims, 1 Drawing Sheet

FOREIGN PATENT DOCUMENTS

| | | |
|---|---|---|
| JP | 2000-181137 | 6/2000 |
| JP | 2001-265056 | 9/2001 |
| JP | 2001-272817 | 10/2001 |
| JP | 2001-330989 | 11/2001 |

OTHER PUBLICATIONS

Full English translation of JP 6009844A.*
Database/WPI, Section Ch, Week 199748, XP-002393824.
Database/WPI, Section Ch, Week 198528, XP-002393825.
Supplementary Partial European Search Report dated Aug. 22, 2006, issued in corresponding EP Application No. 02805020.1.
U.S. Appl. No. 10/475,716, filed Feb. 28, 2003, Kishiki, et al.

* cited by examiner

RESIN FOR TONER BINDER AND TONER COMPOSITION

TECHNICAL FIELD

The present invention relates to a polyester resin for toner binders to be used in developing electrostatic images in electrophotography, electrostatic recording, electrostatic printing and so on, and to a toner composition comprising the same.

BACKGROUND ART

Toner binders used in toners for developing electrostatic images are required to satisfy two contradictory requirements, namely they should have the ability to be fixed even at a low hot roller temperature (low temperature fixability) and the inability to fuse to the hot roller even at a high hot roller temperature (anti-hot offset property).

A number of proposals have been offered to improve the low temperature fixability and anti-hot offset property of polyester-based toner binders by blending two different polyesters differing in molecular weight distribution (e.g. Japanese-Kokai Publication 2001-265056). These use two polyesters differing in molecular weight distribution as a low viscosity polyester for meeting the low temperature fixability requirement and as a high viscosity polyester for meeting the anti-hot offset property requirement. In recent years, a higher and higher level of low temperature fixability has been demanded from the energy saving viewpoint and, from the viewpoint of miniaturization of copiers and like apparatus, a higher and higher level of anti-hot offset property has been demanded.

SUMMARY OF THE INVENTION

When the technique which comprises further increasing the difference in viscosity between two polyesters for further improving the low temperature fixability and anti-hot offset property is employed, the miscibility of the two polyesters decreases and poor development results are produced. When the mold release agent amount is increased, the toner fluidity lowers and the toner durability is adversely affected.

The present inventors made intensive investigations in an attempt to develop a resin for toner binders excellent in low temperature fixability and anti-hot offset property and capable of giving good development results and providing toners with good fluidity and, as a result, found that the problems discussed above can be solved by (1) using a combination of two polyester resins each having a specific composition and/or (2) using a resin whose L value calculated from the amount of heat absorbed corresponding to the endothermic peak in a DSC curve and the glass transition temperature thereof falls within a specific range. Such and other findings have now led to the present invention.

Thus, in five aspects thereof, the present invention consists in the following:

[Invention in a First Aspect]

A resin for toner binders, which comprises two polyester resins (A) and (B), said resin (A) being a crosslinked modified polyester resin consisting of the reaction product from a crosslinked polyester resin (a) and a polyepoxide (c) and said resin (B) being an acid anhydride-modified linear polyester resin consisting of the reaction product from a linear polyester resin (b) and an acid anhydride (r).

[Invention in a Second Aspect]

A polyester resin-based resin for toner binders, which comprises 25 to 100% by weight of a polyester resin (C) having a value, falling within the range of 1 to 30, of L as calculated from the amount of heat absorbed (Q) corresponding to the endothermic peak occurring on the higher temperature side of the glass transition-due stepwise change in a DSC curve as obtained by measurement with a differential scanning calorimeter upon the first temperature raising and from the glass transition temperature (Tg) according to the formula (I) given below, and 0 to 75% by weight of a polyester resin (D) other than (C):

$$L=(Q\times100)/(100-Tg) \quad (I)$$

where Q is in mJ/mg, and Tg in ° C.

[Invention in a Third Aspect]

A resin composition for toner binders, which comprises the resin for toner binders according to the first or second aspect of the invention and at least one mold release agent selected from the group consisting of carnauba wax, Fischer-Tropsch waxes, paraffin waxes and polyolefin waxes.

[Invention in a Fourth Aspect]

A toner composition, which comprises a resin for toner binders comprising two polyester resins (A) and (B), and a colorant, if necessary together with at least one agent selected from among mold release agents and charge control agents, said resin for toner binders being a polyester resin according to the first aspect of the invention.

[Invention in a Fifth Aspect]

A toner composition which comprises a polyester-based resin for toner binders and a colorant, if necessary together with at least one agent selected from among mold release agents and charge control agents, said resin for toner binders being a polyester resin according to the second aspect of the invention.

DETAILED DESCRIPTION OF THE INVENTION

In the following, the present invention is described in detail.

The resin for toner binders according to the first aspect of the invention comprises, as essential components, a crosslinked modified polyester resin (A) and an acid anhydride-modified linear polyester resin (B). The resins (A) and (B) each may comprise a combination of two or more species. By comprising (A) and (B), the resin is improved in low temperature fixability and anti-hot offset property and can give good development results.

The crosslinked modified polyester resin (A) is the reaction product from a crosslinked polyester resin (a) and a polyepoxide (c). Preferably, the crosslinked polyester resin (a) is the polycondensate obtained by reacting a dicarboxylic acid (p1) and a diol (q1) together with a tri- or further basic polycarboxylic acid (p2) and/or a tri- or further hydric polyol (q2). The acid anhydride-modified linear polyester resin (B) is obtained by reacting a linear polyester resin (b), which is obtained by reacting a dicarboxylic acid (p1) with a diol (q1), with an acid anhydride (r).

Examples of the dicarboxylic acid (p1) to be mentioned are alkylenedicarboxylic acids containing 4 to 50 carbon atoms (succinic acid, adipic acid, azelaic acid, sebacic acid, dodecanedicarboxylic acid, octadecanedicarboxylic acid, dodecenylsuccinic acid, pentadecenylsuccinic acid, octadecenylsuccinic acid, dimer acids, etc.); alkenylenedicarboxylic acids containing 4 to 50 carbon atoms (maleic acid, fumaric acid, etc.); aromatic dicarboxylic acids containing 8 to 36 carbon atoms (phthalic acid, isophthalic acid, terephthalic acid, naphthalenedicarboxylic acids, etc.); and the like.

The combined use of two or more of these will not produce any problem. The acid anhydrides or lower (C1-C4) alkyl esters (methyl ester, ethyl ester, isopropyl ester, etc.) may also be used as (p1).

Preferred among these are alkylenedicarboxylic acids containing 4 to 50 carbon atoms, alkenylenedicarboxylic acids containing 4 to 20 carbon atoms, and aromatic dicarboxylic acids containing 8 to 20 carbon atoms. More preferred are alkenylsuccinic acids containing 16 to 50 carbon atoms, terephthalic acid, isophthalic acid, maleic acid, fumaric acid, and combinations of these. Terephthalic acid is most preferred, however.

Examples of the diol (q1) to be mentioned are alkylene glycols containing 2 to 36 carbon atoms (ethylene glycol, 1,2-propylene glycol, 1,3-propylene glycol, 1,4-butanediol, 1,6-hexanediol, dodecanediol, etc.); alkylene ether glycols containing 4 to 36 carbon atoms (diethylene glycol, triethylene glycol, dipropylene glycol, polyethylene glycol, polypropylene glycol, polytetramethylene ether glycol, etc.); alicyclic diols containing 6 to 36 carbon atoms (1,4-cyclohexanedimethanol, hydrogenated bisphenol A, hydrogenated bisphenol F, etc.); adducts of the above-mentioned alicyclic diols with an alkylene oxide(s) containing 2 to 4 carbon atoms [ethylene oxide (hereinafter referred to as "EO" for short), propylene oxide (hereinafter referred to as "PO" for short), butylene oxide, styrene oxide, α-olefin oxide containing 5 to 8 carbon atoms, etc.; hereinafter collectively referred to as "AO"] (the number of moles of AO being 2 to 30); and AO adducts of bisphenols (bisphenol A, bisphenol F, bisphenol S, etc.) (the number of moles of AO being 2 to 30); and so forth.

Preferred among these are alkylene glycols containing 2 to 12 carbon atoms, AO adducts of bisphenols (the number of moles of AO being 2 to 30), alicyclic diols containing 6 to 24 carbon atoms, and combinations of these. More preferred are AO adducts of bisphenols (the number of moles of AO being 2 to 8), and the combinations thereof with an alkylene glycol(s) containing 2 to 12 carbon atoms.

Examples of the tri- or further basic polycarboxylic acid (p2) to be mentioned are aromatic polycarboxylic acids containing 9 to 20 carbon atoms (trimellitic acid, pyromellitic acid, etc.); vinyl polymers of unsaturated carboxylic acids [number average molecular weight (hereinafter referred to as "Mn"; determined by gel permeation chromatography (GPC)): 450 to 10,000] (styrene-maleic acid copolymer, styrene-acrylic acid copolymer, α-olefin-maleic acid copolymers, styrene-fumaric acid copolymer, etc.); and the like.

The acid anhydrides or lower (C1-C4) alkyl esters (methyl ester, ethyl ester, isopropyl ester, etc.) of those mentioned above may also be used as (p2).

Preferred among these are aromatic polycarboxylic acids containing 9 to 20 carbon atoms. Most preferred are trimellitic acid, trimellitic anhydride, and pyromellitic acid.

Examples of the tri- or further hydric polyol (q2) to be mentioned are tri- to octa-hydric or further hydric polyhydric aliphatic alcohols containing 3 to 36 carbon atoms (glycerol, trimethylolethane, trimethylolpropane, pentaerythritol, sorbitol, etc.); AO adducts of the above-mentioned aliphatic polyols (the number of moles of AO being 2 to 30); AO adducts of trisphenols (trisphenol PA etc.) (the number of moles of AO being 2 to 30); AO adducts of novolak resins (phenol novolak, cresol novolak, etc.; average degree of polymerization: 3 to 60) (the number of moles of AO being 2 to 30); and so forth.

Preferred among them are tri- to octa-hydric or further hydric polyhydric aliphatic alcohols containing 3 to 36 carbon atoms and AO adducts of novolak resins (the number of moles of AO being 2 to 30). Most preferred are AO adducts of novolak resins (the number of moles of AO being 2 to 30).

It is also possible to copolymerize a hydroxycarboxylic acid (e.g. hydroxystearic acid, hydrogenated castor oil, etc.) together with (p1), (q1), (p2) and (q2).

Examples of the polyepoxide (c) to be reacted with the crosslinked polyester resin (a) to be mentioned are polyglycidyl ethers [ethylene glycol diglycidyl ether, tetramethylene glycol diglycidyl ether, bisphenol A diglycidyl ether, bisphenol F diglycidyl ether, glycerol triglycidyl ether, pentaerythritol tetraglycidyl ether, glycidyl-etherified phenol novolak (average degree of polymerization 3 to 60), etc.]; and diene oxides containing 5 to 30 carbon atoms (pentadiene dioxide, hexadiene dioxide, etc.), for example. Preferred among them are polyglycidyl ethers. More preferred are ethylene glycol diglycidyl ether and bisphenol A diglycidyl ether.

The number of epoxy groups per molecule of (c) is preferably 2 to 8, more preferably 2 to 6, most preferably 2 to 4.

The epoxy equivalent of (c) is preferably 50 to 500 (g/eq; hereinafter the same shall apply). The lower limit is more preferably 70, most preferably 80, and the upper limit is more preferably 300, most preferably 200. When the number of epoxy groups and/or the epoxy equivalent are within the respective ranges mentioned above, the development results and fixability both become better. It is more desirable that both the number of epoxy groups per molecule and the epoxy equivalent be within the respective ranges mentioned above.

By reacting (a) with (c) for extension and/or crosslinking, it becomes possible to attain a higher molecular weight with ease and attain an improvement in anti-hot offset property.

As the acid anhydride (r) to be used in preparing the acid anhydride-modified linear polyester resin (B), there may be mentioned aromatic polycarboxylic acid anhydrides containing 8 to 36 carbon atoms (phthalic anhydride, trimellitic anhydride, pyromellitic anhydride, naphthalenedicarboxylic anhydride, etc.); aliphatic polycarboxylic acid anhydrides containing 4 to 50 carbon atoms (maleic anhydride, succinic anhydride, dodecenylsuccinic anhydride, etc.); and so on.

Preferred among them are aromatic dicarboxylic acid anhydrides containing 8 to 24 carbon atoms. More preferred is trimellitic anhydride.

In the first aspect of the invention, the ratio between the polyol and polycarboxylic acid in preparing the crosslinked modified polyester resin (A) as expressed in terms of the hydroxyl-to-carboxyl equivalent ratio [OH]/[COOH] is preferably 2/1 to 1/2, more preferably 1.5/1 to 1/1.3, most preferably 1.3/1 to 1/1.2.

The proportions of the tri- or further basic polycarboxylic acid (p2) and tri- or further hydric polyol (q2) are preferably such that the sum of the numbers of moles of (p2) and (q2) are 0.1 to 40 mole %, more preferably 1 to 25 mole %, still more preferably 3 to 20 mole %, most preferably 5 to 15 mole %, relative to the sum of the numbers of moles of (p1), (p2), (q1) and (q2).

As for the tri- or further basic or hydric components, the combined use of (p2) and (q2) is preferred, and the combined use of a tri- or further basic aromatic polycarboxylic acid and an AO adduct of a novolak resin is particularly preferred in view of improvements in anti-hot offset property and low temperature fixability.

The method of producing (A) is not particularly restricted but, for example, the following methods may be mentioned.

The dicarboxylic acid (p1), diol (q1) and tri- or further hydric polyol (q2) are heated at 150 to 280° C. in an inert atmosphere, for example under nitrogen, for dehydration condensation, followed by further reaction with the tri- or further basic polycarboxylic acid (p2) to give a polycondensate. The use of an esterification catalyst, such as tetrabutyl titanate, dibutyltin oxide or potassium titanyl oxalate, and/or a reduced pressure is effective in raising the rate of reaction. The thus-obtained polycondensate [crosslinked polyester resin (a)] is reacted with the polyepoxide (c) at 160 to 260° C. for causing molecular extension and/or crosslinking, whereby the crosslinked modified polyester resin (A) can be obtained. It is also possible to obtain (a) by reacting (p2) with (p1), (q1) and (q2) simultaneously. Among these methods, the former one is preferred.

The acid value of (a) to be reacted with (c) is preferably 1 to 60 (mg KOH/g; the same shall apply to the acid values given hereinafter). The lower limit is more preferably 5, and the upper limit is more preferably 50. When the acid value is not lower than 1, (c) will not remain unreacted, hence the performance characteristics of the resin will not be adversely affected. When it is not higher than 60, the heat stability of the resin becomes good.

The amount of (c) to be used in preparing (A) is preferably 0.01 to 10% relative to (a) from the viewpoint of low temperature fixability and anti-hot offset property. The lower limit is more preferably 0.05%, most preferably 0.1%. The upper limit is more preferably 5%, most preferably 3%.

In the preceding and subsequent description, "%", when used with respect to usages and contents, means "% by weight", unless otherwise specified.

After arrival at a point close to the reaction end point, the reaction is allowed to proceed while checking for the viscosity or softening point, acid value and other factors and, upon arrival at the predetermined viscosity or softening point and acid value, the reaction product is taken out of the reactor and cooled, whereby (A) is obtained.

The tetrahydrofuran (THF) insoluble matter content in (A) is preferably 5 to 70%. The lower limit is more preferably 7%, most preferably 15%, and the upper limit is more preferably 50%, still more preferably 40%, most preferably 37%. A THF insoluble matter content within the above range is preferred since the anti-hot offset property is improved then.

The softening point of (A) is preferably 120 to 200° C. The lower limit is more preferably 125° C., still more preferably 130° C., most preferably 135° C., and the upper limit is more preferably 170° C., still more preferably 165° C., most preferably 160° C. When the softening point is within the above range, good anti-hot offset property can be obtained.

From the anti-offset property viewpoint, the weight average molecular weight (hereinafter referred to as "Mw"; determined by GPC) of the THF-soluble matter in (A) is preferably not lower than 10,000, more preferably not lower than 15,000, most preferably 20,000 to 2,000,000.

The glass transition point (Tg) of (A) is preferably 45 to 80° C. The lower limit is more preferably 50° C., and the upper limit is more preferably 75° C. A Tg not lower than 45° C. is preferred from the thermal storage stability viewpoint while a Tg not higher than 80° C. is preferred from the low temperature fixability viewpoint.

The hydroxyl value of (A) is preferably 70 (mg KOH/g; hereinafter the same shall apply as far as hydroxyl values are concerned), more preferably 5 to 50, most preferably 8 to 45. A smaller hydroxyl value is preferred in view of improved environmental stability and charge amount.

The acid value of (A) is preferably 0 to 40. The lower limit is more preferably 8, still more preferably 13, most preferably 15, and the upper limit is more preferably 30, most preferably 27. Although a lower acid value contributes to improve environmental stability, an appropriate acid value is preferred since it contributes to improve rise in electrification and to improve anti-hot offset property.

The acid value of (A) (AVA) is preferably such that the function $\{AVA-[WPA\times(XPA-2)\times561/MPA]\}$, where WPA (in %) is the content of tri- or further basic polycarboxylic acids or anhydrides thereof in (A), MPA is the average molecular weight of the tri- or further basic polycarboxylic acids or anhydrides thereof and XPA is the mean functionality of the tri- or further basic polycarboxylic acids or anhydrides thereof in (A), be within the range of −10 to 10, more preferably −5 to 10, most preferably −5 to 5.

As specific examples of (A), there may be mentioned the following (1) to (4):

(1) Crosslinked modified polyesters obtainable by reacting ethylene glycol diglycidyl ether with polycondensate of bisphenol A-PO (2 moles) adduct/bisphenol A-PO (3 moles) adduct/phenol novolak-EO (5 moles) adduct/terephthalic acid/fumaric acid/trimellitic anhydride.

(2) Crosslinked modified polyesters obtainable by reacting tetramethylene glycol diglycidyl ether with polycondensate of bisphenol A-PO (2 moles) adduct/phenol novolak-PO (5 moles) adduct/terephthalic acid/dodecenylsuccinic anhydride/trimellitic anhydride.

(3) Crosslinked modified polyesters obtainable by reacting bisphenol A diglycidyl ether with polycondensate of bisphenol A-PO (2 moles) adduct/bisphenol A-PO (3 moles) adduct/phenol novolak-EO (5 moles) adduct/terephthalic acid/fumaric acid/trimellitic anhydride.

(4) Crosslinked modified polyesters obtainable by reacting glycidyl-etherified phenol novolak With polycondensate of bisphenol A-PO (2 moles) adduct/bisphenol A-EO (2 moles) adduct/terephthalic acid/trimellitic anhydride.

The ratio between the diol and the total polycarboxylic acid [inclusive of the acid anhydride (r)] in preparing the acid anhydride-modified linear polyester (B), as expressed in terms of hydroxyl group-to-carboxyl group equivalent ratio [OH]/[COOH], is preferably 2/1 to 1/2, more preferably 1.5/1 to 1/1.5, most preferably 1.4/1 to 1/1.4.

The proportion of the acid anhydride (r) is preferably 1 to 30 mole % relative to the sum of the all polycarboxylic acid units constituting (B). The lower limit is more preferably 3 mole %, most preferably 7 mole %, and the upper limit is more preferably 27 mole %, most preferably 24 mole %. From the toner fluidity viewpoint, a level of not lower than 1 mole % is preferred and, from the low temperature fixability viewpoint, a level of not higher than 30 mole % is preferred.

As the method of producing the acid anhydride-modified linear polyester (B), there may be mentioned the following, for instance.

Using the dicarboxylic acid (p1) and diol (q1), polyesterification is carried out in the conventional manner to give a polycondensate, the acid anhydride (r) is then added thereto, and half esterification of the acid anhydride is effected substantially preferentially by carrying out the reaction preferably at 150 to 220° C., more preferably at 170 to 200° C., at ordinary pressure or under pressure for 30 minutes to 3 hours, whereby (B) can be obtained.

The Mw (by GPC) of (B) is preferably not higher than 20,000, more preferably 2,000 to 15,000, still more preferably 2,500 to 8,000, most preferably 3,000 to 7,000. A Mw of not higher than 20,000 is preferred from the low temperature fixability viewpoint.

The Mn of (B) is preferably not lower than 1,000, more preferably 1,300 to 10,000, still more preferably 1,500 to 5,000, most preferably 1,600 to 4,000. A Mn of not lower than 1,000 is preferred from the thermal storage stability viewpoint.

The glass transition point of (B) is preferably 45 to 80° C. The lower limit is more preferably 50° C., and the upper limit is more preferably 75° C. A Tg of not lower than 45° C. is preferred from the thermal storage stability, and a Tg of not higher than 80° C. is preferred from the low temperature fixability viewpoint.

The softening point of (B) is preferably 80 to 120° C. The lower limit is more preferably 82° C., most preferably 85° C., and the upper limit is more preferably 115° C., most preferably 110° C. A level of not lower than 80° C. is preferred from the thermal storage stability, and a level of not higher than 120° C. is preferred from the low temperature fixability viewpoint.

The softening point of (B) is generally lower than that of the crosslinked modified polyester (A), and the difference therebetween is preferably 10° C. to 60° C. The lower limit is more preferably 25° C., most preferably 30° C., and the upper limit is more preferably 50° C. From the viewpoint of the balance between low temperature fixability and anti-hot offset property, it is desirable that the softening point of (B) be lower than that of (A). In view of the ease of homogenizing (A) and (B) together in toner preparation and the possibility of good development results being obtained, the difference in softening point is preferably not greater than 60° C.

The THF insoluble matter content of (B) is preferably not higher than 3%, more preferably not higher than 1%, most preferably 0%. A lower THF insoluble matter content of (B) is preferred from the viewpoint of improvement in low temperature fixability.

The hydroxyl value of (B) is preferably not higher than 70, more preferably 5 to 50, most preferably 10 to 45. A hydroxyl value of not higher than 70 is preferred since it contributes to improve environmental stability and amount of charge.

The acid value of (B) is preferably 1 to 50. The lower limit is more preferably 3, still more preferably 10, most preferably 15, and the upper limit is more preferably 45, still more preferably 40, most preferably 37. While a lower acid value contributes to improve environmental stability, an appropriate acid value is preferred since it contributes to improve rise in electrification.

The acid value of (B) (AVB) is preferably such that the function {AVB−[WPB×(XPB−1)×561/MPB]}, where WPB (in %) is the content of tri- or further basic polycarboxylic acids or anhydrides thereof in (B), MPB is the average molecular weight of the tri- or further basic polycarboxylic acids or anhydrides thereof and XPB is the mean functionality of the tri- or further basic polycarboxylic acids or anhydrides thereof in (B), be within the range of −10 to 15, more preferably −6 to 12, most preferably −3 to 10.

As specific examples of (B), there may be mentioned, for example, the following (5) to (8):

(5) Linear polyesters obtainable by reacting trimellitic anhydride with polycondensate of bisphenol A-PO (2 moles) adduct/bisphenol A-EQ (2 moles) adduct/terephthalic acid.

(6) Linear polyesters obtainable by reacting maleic anhydride with polycondensate of bisphenol A-PO (2 moles) adduct/dodecenylsuccinic anhydride/terephthalic acid.

(7) Linear polyesters obtainable by reacting trimellitic anhydride with polycondensate of bisphenol A-PO (2 moles) adduct/bisphenol A-PO (3 moles) adduct/terephthalic acid.

(8) Linear polyesters obtainable by reacting trimellitic anhydride with polycondensate of bisphenol A-PO (2 moles) adduct/bisphenol A-EO (2 moles) adduct/terephthalic acid.

The ratio between the crosslinked modified polyester (A) and acid anhydride-modified linear polyester (B) is preferably 80:20 to 20:80 in weight. The upper limit to the proportion of (A) is more preferably 70, still more preferably 60, most preferably 55, and the lower limit to the proportion of (A) is more preferably 30, most preferably 40. When the proportion of (A) is not higher than 80, the low temperature fixability becomes good and, when it is not lower than 20, the anti-hot offset property becomes good.

In the resin for toner binders according to the first aspect of the invention, a polyester resin composed of (A) and (B) alone is preferably used. However, a resin other than (A) and (B) [e.g. (a)] may be used preferably in an amount not larger than 10% (more preferably not larger than 5%) in the polyester resin.

Furthermore, it is preferred that (A) or both of (A) and (B) [more preferably (A) alone] each be a resin according to the second aspect of the invention, namely a resin having a value, falling within the range of 1 to 30, of L as calculated from the amount of heat absorbed (Q) corresponding to the endothermic peak occurring on the higher temperature side of the glass transition-due stepwise change in a DSC curve as obtained by measurement with a differential scanning calorimeter upon the first temperature raising and from the glass transition temperature (Tg) according to the formula (I) given below, since such resin brings about further improvements in low temperature fixability, anti-hot offset property and toner fluidity.

$$L=(Q\times 100)/(100-Tg) \quad (I)$$

where Q is in mJ/mg, and Tg in ° C.

The amount of heat absorbed (Q) corresponding to the endothermic peak occurring on the higher temperature side of the glass transition-due stepwise change in a DSC curve as obtained by measurement with a differential scanning calorimeter upon the first temperature raising, which amount is to be used in L value calculation of a polyester resin (C) in accordance with the second aspect of the invention, is represented by the amount of heat corresponding to the area enclosed by the straight line resulting from extension of the baseline on the higher temperature side of the stepwise change to the lower temperature side and the DSC curve, as shown by the slanting line area in FIG. 1. The value of L calculated from Q and Tg according to the above equation (I) is a physical characteristic value related to the state of arrangement of molecules of (C) and, from the viewpoint of low temperature fixability, anti-hot offset property and/or toner fluidity, L is preferably 1 to 30. The lower limit is more preferably 3, still more preferably 5, most preferably 7, and the upper limit is more preferably 25, still more preferably 20, most preferably 19.

The polyester resin (C) includes those polyepoxide (c) (mentioned above)-modified polyester resins.

The DSC curve upon the first temperature raising is measured using a differential scanning calorimeter by the method prescribed in JIS K 7121-1987. More specifically, 5.0 mg of a sample is cooled from 30° C. to −20° C. at a cooling rate of 90° C. per minute, held at that temperature for 10 minutes and then the temperature is raised to 120° C. at a heating rate of 20° C. per minute, and the DSC curve on the occasion of the first temperature raising is recorded.

The glass transition temperature (Tg) is an extrapolated glass transition initiation temperature (° C.) defined in JIS K 7121-1987. Thus, following the above-mentioned first temperature raising, the temperature of 120° C. is maintained for 10 minutes, then the sample is cooled to −20° C. at a cooling rate of 90° C. per minute and maintained at that temperature for 13 minutes, the temperature is then raised to 120° C. at a heating rate of 20° C. per minute, and the glass transition temperature is determined using the DSC curve measured on the occasion of this second temperature raising.

Usable as the measuring apparatus is Seiko Denshi Kogyo Co., Ltd.'s DSC 20, SSC/580, for instance.

As the polyester resin (C) constituting the resin for toner binders according to the second aspect of the invention, there may be mentioned polyester resins (C1) which are polycarboxylic acid-polyol polycondensates, modified polyester resins (C2) derived from (C1) by at least partial modification thereof with a polyepoxide (c), and the like.

These (C) species [denoting (C1) or (C2) species; hereinafter the same shall apply] may be used in combination of two or more of them, and (C1) and (C2) may be used in combination.

As the polycarboxylic acid, there may be mentioned those dicarboxylic acids (p1) and tri- or further basic polycarboxylic acids (p2) described hereinabove. As the polyol, there may be mentioned those diols (q1) and tri- or further hydric polyols (q2) described hereinabove.

As (C1), there may be mentioned linear polyester resins (C11) obtained from (p1) and (q1), crosslinked polyester resins (C12) obtained from (p1) and (q1) together with (p2) and/or (q2), and the like. Among (C1), resins (C12) are preferred.

As specific examples of (C11), there may be mentioned the following (9) to (11), for instance:

(9) Polycondensates of bisphenol A-PO (2 moles) adduct/terephthalic acid.

(10) Polycondensates of bisphenol A-EO (4 moles) adduct/bisphenol A-PO (2 moles) adduct/terephthalic acid.

(11) Polycondensates of bisphenol A-PO (2 moles) adduct/bisphenol A-PO (3 moles) adduct/terephthalic acid/isophthalic acid/maleic anhydride.

As specific examples of (C12), there may be mentioned the following (12) to (18), for instance:

(12) Polycondensates of bisphenol A-EO (2 moles) adduct/bisphenol A-PO (3 moles) adduct/terephthalic acid/phthalic anhydride/trimellitic anhydride.

(13) Polycondensates of bisphenol A-PO (2 moles) adduct/bisphenol A-PO (3 moles) adduct/bisphenol A-EO (2 moles) adduct/phenol novolak-PO (5 moles) adduct/terephthalic acid/dimethyl terephthalate/trimellitic anhydride.

(14) Polycondensates of bisphenol A-EO (2 moles) adduct/bisphenol A-PO (2 moles) adduct/terephthalic acid/trimellitic anhydride.

(15) Polycondensates of bisphenol A-EO (2 moles) adduct/bisphenol A-PO (2 moles) adduct/terephthalic acid/maleic anhydride/trimellitic anhydride.

(16) Polycondensates of bisphenol A-PO (2 moles) adduct/bisphenol A-PO (3 moles) adduct/terephthalic acid/isophthalic acid/maleic anhydride/trimellitic anhydride.

(17) Polycondensates of bisphenol A-PO (2 moles) adduct/bisphenol A-PO (3 moles) adduct/phenol novolak-EO (4 moles) adduct/isophthalic acid/trimellitic anhydride.

(18) Polycondensates of bisphenol A-EO (2 moles) adduct/bisphenol A-PO (2 moles) adduct/phenol novolak-PO (5 moles) adduct/terephthalic acid/fumaric acid/trimellitic anhydride.

As (C2), there may be mentioned linear modified polyester resins (C21) resulting from reaction of (C11) with (c), and crosslinked modified polyester resins (C22) resulting from reaction of (C12) with (c). The resins (C22) are preferred. More specifically, the following (19) to (28) may be mentioned, for example:

(19) Modified polyesters obtainable by reacting tetramethylene glycol diglycidyl ether with polycondensate of bisphenol A-PO (2 moles) adduct/bisphenol A-EO (2 moles) adduct/phenol novolak-PO (5 moles) adduct/terephthalic acid/dodecenylsuccinic anhydride.

(20) Modified polyesters obtainable by reacting ethylene glycol diglycidyl ether with polycondensate of bisphenol A-PO (2 moles) adduct/bisphenol A-PO (3 moles) adduct/bisphenol A-EO (2 moles) adduct/phenol novolak-PO (5 moles) adduct/terephthalic acid/dodecenylsuccinic anhydride.

(21) Modified polyesters obtainable by reacting bisphenol A diglycidyl ether with polycondensate of bisphenol A-PO (2 moles) adduct/bisphenol A-PO (3 moles) adduct/phenol novolak-EO (4 moles) adduct/isophthalic acid/maleic anhydride/trimellitic anhydride.

(22) Modified polyesters obtainable by reacting bisphenol A diglycidyl ether with polycondensate of bisphenol A-PO (2 moles) adduct/bisphenol A-PO (3 moles) adduct/bisphenol A-EO (2 moles) adduct/phenol novolak-EO (5 moles) adduct/terephthalic acid/trimellitic anhydride.

(23) Modified polyesters obtainable by reacting bisphenol A diglycidyl ether with polycondensate of bisphenol A-PO (2 moles) adduct/bisphenol A-PO (3 moles) adduct/bisphenol A-EO (2 moles) adduct/phenol novolak-PO (5 moles) adduct/terephthalic acid/isophthalic acid/maleic anhydride/trimellitic anhydride.

(24) Modified polyesters obtainable by reacting ethylene glycol diglycidyl ether with polycondensate of bisphenol A-PO (3 moles) adduct/phenol novolak-PO (5 moles) adduct/terephthalic acid/fumaric acid/trimellitic anhydride.

(25) Modified polyesters obtainable by reacting tetramethylene glycol diglycidyl ether with polycondensate of bisphenol A-PO (2 moles) adduct/phenol novolak-PO (5 moles) adduct/terephthalic acid/dodecenylsuccinic anhydride/trimellitic anhydride.

(26) Modified polyesters obtainable by reacting ethylene glycol diglycidyl ether with polycondensate of bisphenol A-PO (2 moles) adduct/bisphenol A-EO (2 moles) adduct/phenol novolak-EO (5 moles) adduct/terephthalic acid/trimellitic anhydride.

(27) Modified polyesters obtainable by reacting bisphenol A diglycidyl ether with polycondensate of bisphenol A-PO (2 moles) adduct/bisphenol A-PO (3 moles) adduct/phenol novolak-PO (5 moles) adduct/terephthalic acid/trimellitic anhydride.

(28) Modified polyesters obtainable by reacting glycidyl-etherified phenol novolak with polycondensate of bisphenol A-PO (2 moles) adduct/bisphenol A-EO (2 moles) adduct/terephthalic acid/trimellitic anhydride.

The ratio between the polyol and polycarboxylic acid in preparing the polyester resin (C), when expressed in terms of the hydroxyl group-to-carboxyl group equivalent ratio [OH]/[COOH], is preferably 2/1 to 1/2, more preferably 1.5/1 to 1/1.3, most preferably 1.3/1 to 1/1.2.

For attaining a high level of anti-hot offset property, which is useful for monochrome copiers and the like, (C12), (C22) and mixtures of these, in particular (C22), are preferred as (C). In that case, high elasticity is preferred and, therefore, (modified) polyester resins in which both (p2) and (q2) are used are particularly preferred. The proportions of (p2) and (q2) are preferably such that the sum of the numbers of moles of (p2) and (q2) preferably amounts to 0.1 to 40 mole %, more preferably 0.5 to 25 mole %, most preferably 1 to 20 mole %, relative to the sum of the numbers of moles of (p1), (p2), (q1) and (q2).

The amount of (c) to be used in obtaining those (C22) species which are suited for use in monochrome copiers is preferably 0.01 to 10% relative to (C12) to be subjected to reaction therewith from the low temperature fixability and anti-hot offset property viewpoint. The lower limit is more preferably 0.05%, most preferably 0.1%, and the upper limit is more preferably 5%, most preferably 3%. The acid value of (C12) to be reacted with (c) is preferably 1 to 60. The lower limit is more preferably 5, and the upper limit is more preferably 50. When the acid value is not lower than 1, (c) will not remain unreacted, hence the performance characteristics of the resulting resin will not be adversely affected. When it is not higher than 60, the heat stability of the resin is good.

From the viewpoint of the ease of adjusting Tg and the improvement in toner capacity for being electrostatically charged, a bisphenol-AO adduct (number of moles of AO added: 2 to 30) is preferably used in an amount of not less than 70 mole %, more preferably not less than 75 mole %, most preferably not less than 80 mole %, relative to the total polyol.

From the anti-hot offset property viewpoint, the temperature (TG) at which the storage modulus (G') of (C) amounts to 6,000 Pa is preferably 130 to 230° C., more preferably 140 to 230° C., most preferably 150 to 230° C.

The temperature TG can be determined, for example, by subjecting a block prepared after 30 minutes of melting and kneading of the resin at 130° C. and 70 rpm using a laboratory plastomill to storage modulus (G') measurements using a dynamic viscoelasticity measuring apparatus while varying the resin temperature.

[Viscoelasticity Measurement Conditions]

Dynamic viscoelasticity measuring apparatus RDS-2 (product of Rheometric Scientific) Measurement frequency: 20 Hz; starting temperature: 90° C.; ending temperature: 200° C.; rate of temperature rise: 10° C./min; strain: 5%.

From the low temperature fixability and thermal storage stability viewpoint, the temperature at which the complex viscosity (η*) of (C) amounts to 1,000 Pa·s is preferably 80 to 140° C., more preferably 90 to 135° C., most preferably 105 to 130° C.

The resin (C) preferably has a THF-insoluble matter content of 5 to 70%, more preferably 10 to 60%, most preferably 15 to 50%. At THF-insoluble matter content level not lower than 5%, good anti-hot offset property is obtained and, at levels not exceeding 70%, good low temperature fixability is attained.

The peak top molecular weight (Mp) of (C) is preferably 1,000 to 30,000, more preferably 1,500 to 25,000, most preferably 1,800 to 20,000. When the Mp is 1,000 or more, the thermal storage stability and powder fluidity become improved and, when it is not more than 30,000, the grindability of the toner becomes improved and the productivity becomes better.

In the chromatogram of (C) as measured by GPC, the proportion of the area in the region corresponding to molecular weights of 500 and below relative to the whole area of the peaks exclusive of the solvent peak is preferably not more than 7%, more preferably not more than 5.5%, still more preferably not more than 4%, most preferably not more than 3%. So long as the proportion of the area in the region corresponding to molecular weights of 500 and below is not more than 7%, the anti-hot offset property and fluidity of the toner derived from the resin in question will be good.

In the above and the subsequent description, the Mp, the proportion of the area of the region corresponding to molecular weights of 500 and below, and the Mn of (C) are determined for the THF-soluble fraction by GPC under the following conditions.

Apparatus: Tosoh HLC-8120

Columns: TSK gel GMHXL (two columns) TSK gel Multipore HXL-M (one column)

Measurement temperature: 40° C.

Sample solution: 0.25% solution in THF

Solution injection size: 100 μl

Detector: Refractive index detector

Reference material: Polystyrene

The molecular weight corresponding to the maximum peak height on the chromatogram obtained is referred to as "peak top molecular weight (Mp)".

The Tg of (C) is preferably 40 to 90° C., more preferably 50 to 80° C., most preferably 55 to 75° C. Within the Tg range of 40° C. to 90° C., the thermal storage stability and low temperature fixability are good.

As for the method of producing the polyester resin (C12), there may be mentioned, for example, the method comprising heating the dicarboxylic acid (p1), diol (q1), tri- or further hydric polyol (q2) and polycondensation catalyst at 160° C. to 260° C. for effecting dehydrocondensation under atmospheric pressure and/or reduced pressure conditions, followed by further reacting with the tri- or further basic polycarboxylic acid (p2).

It is also possible to subject the tri- or further basic polycarboxylic acid (p2) to reaction simultaneously with the dicarboxylic acid (p1), diol (q1) and tri- or further hydric polyol (q2). Among these methods, the former method is preferred.

The polycondensation catalyst is not particularly restricted but potassium titanyl oxalate, dibutyltin oxide, dioctyltin oxide and the like can be used.

As the method of producing the modified polyester resin (C2), there may be mentioned, for example, the method comprising adding the polyglycidyl ether (c) to the polyester resin (C1) and effecting molecular extension and/or crosslinking reaction at 160° C. to 260+ C.

The value of L increases when the rate of cooling is decreased. It can be decreased by selecting the resin composition so as to lower the Tg. A method of obtaining (C) with an L value of 1 to 30 comprises, for example, slowly cooling (cooling at a low rate) to Tg in the step of cooling after completion of the above-mentioned reaction with (c) in the case of (C2) or after completion of the esterification reaction in other cases than (C2).

The time of slow cooling from the reaction temperature to Tg is preferably not shorter than 30 minutes, more preferably not shorter than 1 hour, most preferably not shorter than 3 hours. The upper limit to the slow cooling time is not particularly restricted but preferably is 15 hours or shorter from the productivity viewpoint.

An L value of 1 to 30 can also be obtained by the method comprising rapidly cooling from the reaction temperature to Tg (preferably within 20 minutes), then again heating and maintaining a temperature higher by at least 10° C. than Tg for at least 30 minutes and slowly cooling to Tg over at least 30 minutes. However, the former method is more preferred since it can reduce the production-due energy.

In the resin for toner binders according to the second aspect of the invention, a polyester resin (D) other than (C) may be used in combination with (C). Examples of (D) to be mentioned are resins similar in composition to (C) and having an L value smaller than 1 or exceeding 30 and so forth.

The content of (C) in the whole polyester resin is generally 25 to 100% from the anti-offset property, low temperature fixability and toner fluidity viewpoint. The lower limit is preferably 35%, more preferably 40%, and the upper limit is preferably 80%, more preferably 60%.

When (C) and (D) are used in combination, a resin (C22) [similar in composition to the crosslinked modified polyester resin (A) to be used in accordance with the first aspect of the invention] is preferred as (C), and a resin selected from among the acid anhydride-modified linear polyester resins (B) according to the first aspect of the invention and having an L value smaller than 1 or exceeding 30 (especially L<1) is preferred as (D), since they can improve the development results.

The resins for toner binders according to the first and second aspects of the invention can be used in combination with another binder resin selected from within a wide range unless their characteristics are significantly impaired.

The other resin may be, for example, a styrenic resin, epoxy resin or urethane resin.

Usable as the styrenic resin are styrenic polymers, copolymers of styrene and another vinyl monomer, and so on.

In the polymerization reaction, any of the polymerization reaction catalysts and other auxiliaries known in the art can be used.

Examples of the other vinyl monomer to be mentioned are the following monomers (1) to (7) and combinations thereof:

(1) Carboxyl group- or carboxylate ester group-containing vinyl monomers:

(1)-1) Unsaturated monocarboxylic acids containing 3 to 20 carbon atoms: (meth)acrylic acid, crotonic acid, cinnamic acid, etc.;

(1)-2) Unsaturated dicarboxylic acids containing 4 to 30 carbon atoms and ester-forming derivatives thereof [acid anhydrides and mono- or dialkyl (each alkyl containing 1 to 18 carbon atoms) esters]: maleic acid, fumaric acid, itaconic acid, citraconic acid, acid anhydrides and mono- or dialkyl (each alkyl containing 1 to 18 carbon atoms) esters thereof (methyl ester, ethyl ester, etc.), etc.;

(1)-3) Alkyl (C1-C24) esters of unsaturated carboxylic acids containing 3 to 30 carbon atoms: methyl (meth)acrylate, ethyl (meth)acrylate, butyl (meth)acrylate, 2-ethylhexyl (meth)acrylate, stearyl (meth)acrylate, cyclohexyl (meth) acrylate, etc.;

(1)-4) Polyhydric (di- or trihydric) alcohol esters of unsaturated carboxylic acids containing 3 to 30 carbon atoms: ethylene glycol di(meth)acrylate, propylene glycol di(meth)acrylate, 1,6-hexanediol diacrylate, etc.;

(1)-5) Unsaturated alcohol [vinyl, isopropenyl, etc.] esters of mono- or polycarboxylic acids containing 1 to 12 carbon atoms: vinyl acetate, vinyl butyrate, etc.;

(2) Hydroxyl group-containing vinyl monomers:

(2)-1) Hydroxyalkyl (C5-C16) (meth)acrylates, for example hydroxyethyl (meth)acrylate and hydroxypropyl (meth) acrylate;

(2)-2) Alkenols containing 2 to 12 carbon atoms, for example (meth)allyl alcohol, 1-buten-3-ol, and 2-buten-1-ol;

(2)-3) Alkenediols containing 4 to 12 carbon atoms, for example 2-butene-1,4-diol;

(2)-4) Alkenyl ethers containing 3 to 30 carbon atoms, for example 2-hydroxyethyl propenyl ether, sucrose allyl ether, etc.;

(3) Vinylic hydrocarbons:

(3)-1) Aromatic vinylic hydrocarbons (C8-C20) other than styrene: hydrocarbyl (alkyl, cycloalkyl, aralkyl and/or alkenyl)-substituted styrenes, for example α-methylstyrene, vinyltoluene, 2,4-dimethylstyrene, ethylstyrene, phenylstyrene, cyclohexylstyrene, benzylstyrene, crotylbenzene, divinylbenzene, divinyltoluene, divinylxylene, and trivinylbenzene; and vinylnaphthalene.

(3)-2) Aliphatic vinylic hydrocarbons: alkenes containing 2 to 20 carbon atoms, for example ethylene, propylene, butene, isobutylene, pentene, heptene, diisobutylene, octene, dodecene, octadecene, other α-olefins, etc.; alkadienes containing 4 to 20 carbon atoms, for example butadiene, isoprene, 1,4-pentadiene, 1,5-hexadiene, and 1,7-octadiene;

(3)-3) Alicyclic vinylic hydrocarbons: mono- and dicycloalkenes and alkadienes, for example cyclohexene, (di)cyclopentadiene, vinylcyclohexene, and ethylidenebicycloheptene; terpenes, for example pinene, limonene, and indene.

(4) Epoxy group-containing vinyl monomers: glycidyl (meth)acrylate etc.

(5) Nitrile group-containing vinyl monomers: (meth)acrylonitrile etc.

(6) Isocyanato group-containing vinyl monomers: (meth) acryloyl isocyanate etc.

(7) Amino group-containing vinyl monomers: aminoethyl (meth)acrylate, dimethylaminoethyl (meth)acrylate, diethylaminoethyl (meth)acrylate, tert-butylaminoethyl (meth)acrylate, N-aminoethyl(meth)acrylamide, (meth) allylamine, morpholinoethyl (meth)acrylate, 4-vinylpyridine, crotylamine, vinyl imidazoles, etc.

Usable as the epoxy resin are cured products derived from the polyepoxide (c) with (p1) and/or (p2) or an acid anhydride thereof, and polyaddition products derived from (c) and (q1) and/or (q2), for instance.

In the polyaddition reaction and curing reaction, any of the catalyst known in the art and the like can be used.

Usable as the polyurethane resin are polyaddition products from polyisocyanates and hydroxyl group-containing compounds [e.g. polyester diols obtained by polycondensation of (p1) and (q1), ring opening polymers from caprolactones containing 6 to 12 carbon atoms (γ-butyrolactone, δ-valerolactone, ϵ-caprolactone, etc.), and combinations thereof] and so forth.

In the polyaddition reaction, any of the polyaddition reaction catalysts known in the art and the like can be used.

Useful as the polyisocyanate are aromatic polyisocyanates containing 6 to 20 carbon atoms (except for the carbon atom in the NCO group; hereinafter the same shall apply) [e.g. 1,3- or 1,4-phenylene diisocyanate, 2,4- or 2,6-tolylene diisocyanate (TDI), crude TDI, 2,4'- or 4,4'-diphenylmethanediisocyanate (MDI), and crude MDI]; aliphatic polyisocyanates containing 2 to 18 carbon atoms [e.g. ethylene diisocyanate, tetramethylene diisocyanate, hexamethylene diisocyanate (HDI), and dodecamethylene diisocyanate]; alicyclic polyisocyanates containing 4 to 15 carbon atoms [e.g. isophoronediisocyanate (IPDI), dicyclohexylmethane-4,4'-diisocyanate (hydrogenated MDI), cyclohexylene diisocyanate, and methylcyclohexylene diisocyanate (hydrogenated TDI)]; araliphatic polyisocyanates containing 8 to 15 carbon atoms [e.g. m- or p-xylylene diisocyanate (XDI) and α,α,α',α'-tetramethylxylylene diisocyanate (TMXDI)]; and modifications of these polyisocyanates (e.g. urethane, carbodiimide, allophanate, urea, biuret, uretodione, uretimine, isocyanurate or oxazolidone group-containing modifications and the like); as well as mixtures of two or more of these; and the like.

The other resin preferably has a Mw of 1,000 to 2,000,000.

The content of the other resin in the resin for toner binders is preferably 0 to 40%, more preferably 0 to 30%, most preferably 0 to 20%, based on the total weight of the polyester resin and other resin.

The resin composition for toner binders according to the third aspect of the invention comprises the resin for toner binders according to the first or second aspect of the invention and at least one mold release agent selected from the group consisting of carnauba wax, Fischer-Tropsch waxes, paraffin waxes and polyolefin waxes.

As the carnauba wax, there may be mentioned natural carnauba wax species and free fatty acid-free carnauba wax species.

As the Fischer-Tropsch waxes, there may be mentioned petroleum-derived Fischer-Tropsch waxes (Schumann Sasol's Paraflint H1, Paraflint H1N4 and Paraflint C105, etc.), natural gas-derived Fischer-Tropsch waxes (Shell MDS's FT 100 etc.), and purification products derived from these Fischer-Tropsch waxes by, for example, fractional crystallization (Nippon Seiro's MDP-7000 and MDP-7010, etc.).

As the paraffin waxes, there may be mentioned petroleum wax-based paraffin waxes (Nippon Seiro's paraffin waxes HNP-5, HNP-9 and HNP-11, etc.).

As the polyolefin waxes, there may be mentioned polyethylene waxes (Sanyo Chemical Industries Ltd.'s Sanwax 171P, Sanwax LEL 400P, etc.), and polypropylene waxes (Sanyo Chemical Industries Ltd.'s Viscol 550P and Viscol 660P, etc.).

Among them, carnauba waxes and Fischer-Tropsch waxes and combinations of these are preferred. More preferred are carnauba waxes and petroleum-derived Fischer-Tropsch waxes and combinations of these.

The content of the mold release agent is preferably 0.01 to 20%, more preferably 0.1 to 15%, most preferably 0.5 to 10%, based on the weight of the resin composition for toner binders. At an addition level of the mold release agent within the range of 0.01 to 20%, the resulting toners acquire more improved anti-hot offset property.

The mixing of (A) with (B) in the practice of the first aspect of the invention or the mixing of (C) with (D) [inclusive of the case where two or more (C) species are used] if (D) is used in the practice of the second aspect of the invention or the further mixing of these resins with another resin and/or a mold release agent may be effected beforehand in the manner of powder mixing or melt mixing or in the step of toner preparation. To mix with another or other ingredients in the step of toner preparation or to mix up (A) and (B) [or (C) and (D)] in advance each in a powder form is preferred since the transesterification reaction between (A) and (B) [or (C) and (D)] can then be prevented and the toner fixability can be improved. In cases where the difference in softening point between (A) and (B) [or (C) and (D)] is 50° C. or greater, the resins tend to become heterogeneous in toner particles, hence preliminary melt mixing is preferred.

A mold release agent and/or another or other ingredients can be admixed on the occasion of blending (A) with (B) [or (C) with (D)].

The temperature to be employed in melt mixing is preferably 80 to 180° C., more preferably 100 to 170° C., most preferably 120 to 160° C. When the mixing temperature is not lower than 80° C., sufficient mixing is ensured, never leading to inhomogeneity. At 180° C. or below, there arises no possibility of leveling due to transesterification between (A) and (B) [or (C) and (D)] and the anti-hot offset property and low temperature fixability are favorably improved.

In the case of melt mixing, the mixing time is preferably 10 seconds to 30 minutes, more preferably 20 seconds to 10 minutes, most preferably 30 seconds to 5 minutes. When the mixing time in mixing up two or more polyester resins is not longer than 30 minutes, there arises no possibility of leveling due to transesterification, and the like, and the resin physical properties required of toner binders can be maintained.

In the case of melt mixing, the cooling following mixing is preferably carried out slowly from the mixing temperature to the highest Tg among the Tg's of the mixture-constituting resins over 30 minutes or longer.

The time to be spent for slow cooling from the mixing temperature to that Tg is more preferably not shorter than 1 hour, most preferably not shorter than 3 hours. The upper limit to the slow cooling time is not particularly restricted but, from the productivity viewpoint, it is preferably not longer than 15 hours.

Examples of the mixing apparatus for melt mixing to be mentioned are a batch type mixing apparatus, such as a reaction vessel, and a continuous mixing apparatus. For attaining uniform mixing at an adequate temperature for a short period of time, a continuous mixing apparatus is preferred. Examples of the continuous mixing apparatus to be mentioned are extruders, continuous kneaders, three-roll mills and the like. Among them, extruders and continuous kneaders are preferred, and continuous kneaders are most preferred.

As for the mixing conditions in powder mixing, the mixing temperature is preferably 0 to 80° C., more preferably 10 to 60° C. The mixing time is preferably not shorter than 3 minutes, more preferably 5 to 60 minutes. As the mixing apparatus, there may be mentioned Henschel mixers, Nauta mixers, Banbury mixers and the like. Henschel mixers are preferred, however.

After mixing of the resins for toner binders according to the first and second aspects of the invention with a colorant, if necessary together with one or more of various additives, such as mold release agents and charge control agents, the resulting compositions each is used as the toner composition for developing electrostatic images according to the invention.

Usable as the colorant are those dyes, pigments and magnetic powders which are known in the art. Specifically, there may be mentioned carbon black, Sudan Black SM, Fast Yellow G, Benzidine Yellow, Pigment Yellow, Indofast Orange, IRGAZIN Red, baranitaniline red, Toluidine Red, carmine FB, Pigment Orange R, Lake Red 2G, Rhodamine FB, Rhodamine B Lake, Methyl Violet B Lake, phthalocyanine blue, Pigment Blue, Brilliant Green, phthalocyanine green, Oil Yellow GG, Kayaset YG, Orasol Brown B, Oil Pink OP, magnetite, iron black and the like.

When a dye or pigment is used, the content of the colorant in the toner is preferably 2 to 15%. When a magnetic powder is used, it is preferably 20 to 70%.

As the mold release agent, mention may be made of those mentioned hereinabove. In using it, it may be the same as or different from the mold release agent mentioned above.

The amount of the mold release agent in the toner is preferably 0 to 10%, more preferably 1 to 7%.

Examples of the charge control agent to be mentioned are those known in the art, namely nigrosine dyes, quaternary ammonium salt compounds, quaternary ammonium base-containing polymers, metal-containing azo dyes, salicylic acid metal salts, sulfonic group-containing polymers, fluorine-containing polymers, halo-substituted aromatic ring-containing polymers, etc.

The content of the charge control agent in the toner is generally 0 to 5%.

A flowability providing agent may further be used. Useful as the flowability providing agent are colloidal silica, alumina powders, titanium oxide powders, calcium carbonate powders, and other ones known in the art.

As for the method of producing toners, the known method comprising kneading and grinding and the like methods may be mentioned. After dry blending of the toner constituents mentioned above, the mixture is melt-kneaded and then finely ground using a jet mill or the like, further followed by air classification, whereby particles generally having a particle diameter of 2 to 20 μm are obtained.

The toner compositions according to the fourth and fifth aspect of the invention, if necessary after admixing with carrier particles such as an iron powder, glass beads, a nickel powder, ferrite, magnetite, and/or ferrite whose surface is coated with a resin (e.g. acrylic resin, silicone resin or the like), are used each as an electric latent image developer. It is also possible to form electric latent images by friction with such a member as a charged blade in lieu of the use of carrier particles.

The toner is then fixed to a support (e.g. paper, polyester film and the like) by the conventional hot roller fixation method, or the like method, to give a recorded product.

Toner binders are required to have different physical properties according to their intended use, for full-color use or monochrome use. Accordingly, the polyester resins are designed in different ways.

Thus, for full-color uses, high gloss images are required, hence low viscosity binders are required. For monochrome uses, however, gloss is not much required but more importance is attached to the hot offset property, hence high elasticity binders are required. The resins for toner binders according to the first and second aspects of the invention are suited for use in monochrome copiers, in particular.

EXPLANATION OF SYMBOLS

1 Endothermic peak

Figure 1:
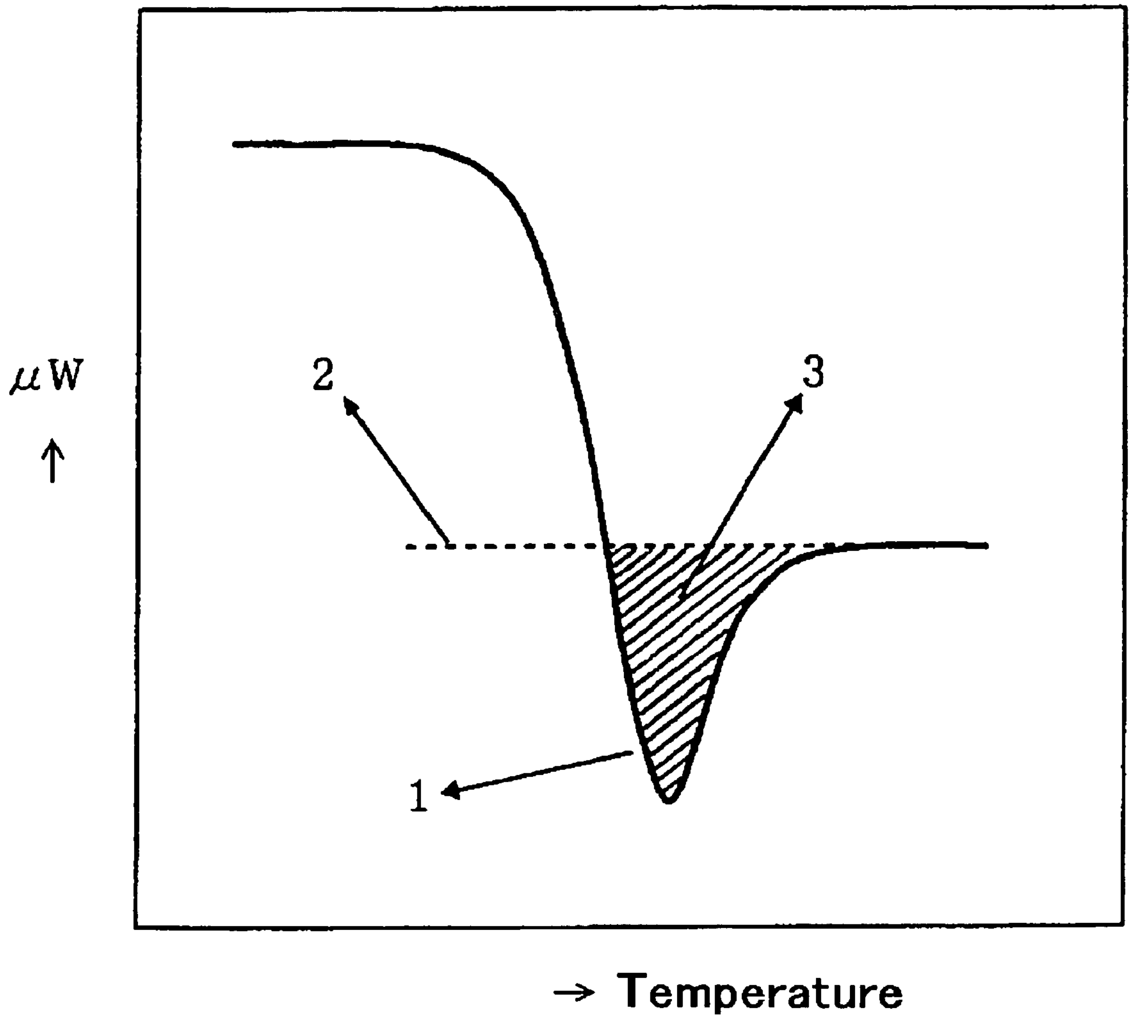
FIG. 1 is a schematic representation of the DSC curve for a polyester resin as recorded upon the first temperature raising (portion showing glass transition-due changes).

2 Straight extension of the base line on the higher temperature side to the lower temperature side 3 Amount of heat absorbed (Q)

BEST MODE FOR CARRYING OUT THE INVENTION

The following examples further illustrate the present invention. They are, however, by no means limitative of the scope of the present invention. In the following, “part(s)” means “part(s) by weight”.

The methods of determining the properties of the resins for toner binders as obtained in the examples and comparative examples are as follows.

1. Acid Value and Hydroxyl Value

The methods prescribed in JIS K 0070-1992

2. Glass Transition Point (Tg)

The method prescribed in the above-cited JIS K 7121-1987 (DSC method).

Apparatus: Seiko Denshi Kogyo Co., Ltd.’s DSC20, SSC/580

3. Molecular Weight

The same as the GPC method described hereinabove for (C).

4. Tetrahydrofuran (THF)-insoluble Matter

THF (50 ml) is added to 0.5 g of each sample, followed by 3 hours of mixing and refluxing. After cooling, the insoluble matter is filtered off using a glass filter carrying Celite #545 and dried at 80° C. under reduced pressure for 3 hours. The insoluble matter content is calculated from the ratio of the weight of the resin on the glass filter to the weight of the sample.

5. Softening Point Determination Method

A flow tester is used, and the temperature is raised at a constant rate under the following conditions. The temperature at which the discharge amount becomes 1/2 is regarded as the softening point.

Apparatus: Shimadzu Corp.’s Flow Tester CFT-500

Load: 20 $kgf/cm^2$

Die: 1 mm Φ-1 mm

Rate of temperature rise: 6° C. /min

EXAMPLE 1

Synthesis of a Crosslinked Modified Polyester Resin (A)

A reaction vessel equipped with a condenser, stirrer and nitrogen inlet tube was charged with 228 parts of bisphenol A-PO (2 moles) adduct, 526 parts of bisphenol A-PO (3 moles) adduct, 16 parts of phenol novolak (average degree of polymerization: about 5)-EO (5 moles) adduct, 119 parts of terephthalic acid, 74 parts of fumaric acid, and 2 parts of dibutyltin oxide as a condensation catalyst, and the reaction was carried out under a nitrogen stream at 220° C. for 10 hours while distilling off the byproduct water. Then, the reaction was further allowed to proceed under reduced pressure (5 to 20 mm Hg) until the acid value arrived at 2 or a lower level. Then, 86 parts of trimellitic anhydride was added, the reaction was then allowed to proceed at ordinary pressure for 1 hour and then under reduced pressure (20 to 40 mm Hg). When the softening point arrived at 120° C. (the acid value was 30), 20 parts of bisphenol A diglycidyl ether (epoxy equivalent: 170) was added and, when the softening point arrived at 150° C., the product was taken out, cooled to room temperature for 20 minutes, and ground into particles. This product is designated as polyester (A1).

The polyester (A1) had a softening point of 150° C., an acid value of 22, a hydroxyl value of 29, a Tg of 60° C., an Mn of 2,900, an Mw of 21,000 and a THF-insoluble matter content of 31%.

Synthesis of an Acid Anhydride-modified Linear Polyester (B)

A reaction vessel equipped with a condenser, stirrer and nitrogen inlet tube was charged with 174 parts of bisphenol A-EO (2 moles) adduct, 555 parts of bisphenol A-PO (2 moles) adduct, 252 parts of terephthalic acid, and 2 parts of dibutyltin oxide as a condensation catalyst, and the reaction was carried out under a nitrogen stream at 230° C. for 10 hours while distilling off the byproduct water. Then, the reaction was further allowed to proceed under reduced pressure (5 to 20 mm Hg) and, when the acid value arrived at 2 or a lower level, the reaction mixture was cooled to 180° C., 74 parts of trimellitic anhydride was added, the reaction was allowed to proceed at ordinary pressure in an enclosed space for 2 hours.

Then, the product was taken out, cooled to room temperature for 20 minutes, and ground into particles. This product is designated as polyester (B1).

The polyester (B1) contained no THF-insoluble matter and had a softening point of 100° C., an acid value of 37, a hydroxyl value of 34, a Tg of 63° C., an Mn of 1,900, and an Mw of 5,000. It was substantially linear.

Preparation of a Resin for Toner Binders

In a continuous kneader, 500 parts of polyester (A1) and 500 parts of polyester (B1) were melt-mixed at a jacket temperature of 150° C. The residence time was 3 minutes. The molten resin was cooled to room temperature, followed by grinding in a grinder into particles. A resin for toner binders (T1) according to the invention was thus obtained.

EXAMPLE 2

Synthesis of a Crosslinked Modified Polyester Resin (A)

A reaction vessel equipped with a condenser, stirrer and nitrogen inlet tube was charged with 431 parts of bisphenol A-PO (2 moles) adduct, 326 parts of bisphenol A-PO (3 moles) adduct, 16 parts of phenol novolak (average degree of polymerization: about 5)-EO (5 moles) adduct, 111 parts of terephthalic acid, 85 parts of fumaric acid, and 2 parts of dibutyltin oxide as a condensation catalyst, and the reaction was carried out under a nitrogen stream at 220° C. for 10 hours while distilling off the byproduct water. Then, the reaction was further allowed to proceed under reduced pressure (5 to 20 mm Hg) until the acid value arrived at 2 or a lower level. Then, 81 parts of trimellitic anhydride was added, the reaction was then allowed to proceed at ordinary pressure for 1 hour and then under reduced pressure (20 to 40 mm Hg). When the softening point arrived at 120° C. (the acid value was 29), 20 parts of ethylene glycol diglycidyl ether (epoxy equivalent: 87) was added and, when the softening point arrived at 150° C., the product was taken out, cooled to room temperature for 20 minutes, and ground into particles. This product is designated as polyester (A2).

The polyester (A2) had a softening point of 150° C., an acid value of 18, a hydroxyl value of 36, a Tg of 64° C., an Mn of 3,700, an Mw of 68,000 and a THF-insoluble matter content of 30%.

Synthesis of an Acid Anhydride-modified Linear Polyester (B)

A reaction vessel equipped with a condenser, stirrer and nitrogen inlet tube was charged with 170 parts of bisphenol A-EO (2 moles) adduct, 203 parts of bisphenol A-PO (2 moles) adduct, 393 parts of bisphenol A-PO (3 moles) adduct, 265 parts of terephthalic acid, and 2 parts of potassium titanyl oxalate as a condensation catalyst, and the reaction was carried out under a nitrogen stream at 230° C. for 10 hours while distilling off the byproduct water. Then, the reaction was further allowed to proceed under reduced pressure (5 to 20 mm Hg) and, when the acid value arrived at 2 or a lower level, the reaction mixture was cooled to 180° C., 47 parts of trimellitic anhydride was added, and the reaction was allowed to proceed at ordinary pressure in an enclosed space for 2 hours. Then, the product was taken out, cooled to room temperature for 20 minutes, and ground into particles. This product is designated as polyester (B2).

The polyester (B2) contained no THF-insoluble matter and had a softening point of 94° C., an acid value of 28, a hydroxyl value of 39, a Tg of 56° C., an Mn of 1,700, and an Mw of 5,400. It was substantially linear.

Preparation of a Resin for Toner Binders

In a Henschel mixer, 500 parts of polyester (A2) and 500 parts of polyester (B2) were subjected to 5 minutes of powder mixing to give a resin for toner binders (T2) according to the invention.

EXAMPLE 3

A resin for toner binders (T3) was prepared by subjecting 500 parts of polyester (A1) and 500 parts of polyester (B2) to powder mixing in the same manner as in Example 2.

COMPARATIVE EXAMPLE 1

Synthesis of a Crosslinked Polyester

A reaction vessel equipped with a condenser, stirrer and nitrogen inlet tube was charged with 431 parts of bisphenol A-PO (2 moles) adduct, 326 parts of bisphenol A-PO (3 moles) adduct, 16 parts of phenol novolak (average degree of polymerization: about 5)-EO (5 moles) adduct, 111 parts of terephthalic acid, 85 parts of fumaric acid, 81 parts of trimellitic anhydride, and 2 parts of dibutyltin oxide as a condensation catalyst, and the reaction was carried out under a nitrogen stream at 220° C. for 10 hours while distilling off the byproduct water. Then, the reaction was further allowed to proceed under reduced pressure (5 to 20 mm Hg) and, when the softening point arrived at 150° C., the product was taken out, cooled to room temperature for 20 minutes, and ground into particles. This product is designated as polyester (RA1).

The polyester (RA1) had a softening point of 150° C., an acid value of 24, a hydroxyl value of 36, a Tg of 65° C., an Mn of 4,100, an Mw of 61,000 and a THF-insoluble matter content of 29%.

Preparation of a Resin for Toner Binders 500 parts of polyester (RA1) and 500 parts of polyester (B1) were subjected to melt mixing in the same manner as in Example 1. The molten resin was cooled to room temperature, followed by grinding in a grinder into particles. A resin for toner binders for comparison (RT1) was thus obtained.

COMPARATIVE EXAMPLE 2

Synthesis of a Linear Polyester

A reaction vessel equipped with a condenser, stirrer and nitrogen inlet tube was charged with 431 parts of bisphenol A-PO (2 moles) adduct, 326 parts of bisphenol A-PO (3 moles) adduct, 16 parts of phenol novolak (average degree of polymerization: about 5)-EO (5 moles) adduct, 111 parts of terephthalic acid, 85 parts of fumaric acid, and 2 parts of dibutyltin oxide as a condensation catalyst, and the reaction was carried out under a nitrogen stream at 220° C. for 10 hours while distilling off the byproduct water. Then, the reaction was further allowed to proceed under reduced pressure (5 to 20 mm Hg) until the acid value arrived 2 or a lower level. The product was then taken out, cooled to room temperature for 20 minutes, and ground into particles. This product is designated as polyester (RB1).

The polyester (RB1) had a softening point of 81° C., an acid value of 1, a hydroxyl value of 41, a Tg of 35° C., an Mn of 1,500, and an Mw of 4,000.

Preparation of a Resin for Toner Binders 500 parts of polyester (A2) and 500 parts of polyester (RB1) were subjected to melt mixing in the same manner as in Example 1. The molten resin was cooled to room temperature, followed by grinding in a grinder into particles. A resin for toner binders for comparison (RT2) was thus obtained.

EXAMPLE 4

Synthesis of a Crosslinked Modified Polyester (C22)

A reaction vessel equipped with a condenser, stirrer and nitrogen inlet tube was charged with 555 parts of bisphenol A-PO (2 moles) adduct, 20 parts of bisphenol A-PO (3 moles) adduct, 130 parts of bisphenol A-EO (2 moles) adduct, 10 parts of phenol novolak (average degree of polymerization: about 5)-EO (5 moles) adduct, 265 parts of terephthalic acid, 10 parts of trimellitic anhydride, and 2 parts of potassium titanyl oxalate as a polycondensation catalyst, and the reaction was carried out under a nitrogen stream at 230° C. for 10 hours while distilling off the byproduct water. Then, the reaction was further allowed to proceed under reduced pressure (5 to 20 mm Hg) until the acid value arrived at 2 or a lower level. Then, 50 parts of trimellitic anhydride was added, the reaction was allowed to proceed at ordinary pressure for 1 hour and then under reduced pressure (20 to 40 mm Hg). When the softening point arrived at 105° C. (the acid value was 28), 20 parts of bisphenol A diglycidyl ether was added. When the softening point arrived at 135° C., the product was taken out, cooled slowly to 100° C. for 3 hours and further to 75° C. for 2 hours and then allowed to cool to room temperature to give a crosslinked modified polyester (C22-1).

(C22-1) had a softening point of 145° C., an acid value of 16, a hydroxyl value of 18, a Tg of 72° C., an Mn of 1,800, an Mp of 6,050 and a THF-insoluble matter content of 37%. The amount of heat absorbed (Q) as determined by DSC measurement was 3.2 mJ/mg, and the L value was 11.4. This product was used as a resin for toner binders (T4) according to the invention.

EXAMPLE 5

Synthesis of a Crosslinked Polyester (C12)

A reaction vessel equipped with a condenser, stirrer and nitrogen inlet tube was charged with 152 parts of bisphenol A-PO (2 moles) adduct, 350 parts of bisphenol A-PO (3 moles) adduct, 40 parts of bisphenol A-EO (2 moles) adduct, 120 parts of phenol novolak (average degree of polymerization: about 5)-PO (5 moles) adduct, 220 parts of terephthalic acid, 30 parts of dimethyl terephthalate, and 2.0 parts of dioctyltin oxide as a polycondensation catalyst, and the reaction was carried out under a nitrogen stream at 230° C. for 10 hours while distilling off the byproduct water. Then, the reaction was further allowed to proceed under reduced pressure (5 to 20 mm Hg). When the acid value arrived at 2 or a lower level, the reaction mixture was cooled to 180° C., 65 parts of trimellitic anhydride was added, and the reaction was allowed to proceed at ordinary pressure for 1 hour and then under reduced pressure (20 to 40 mm Hg). When the softening point arrived at 135° C., the product was taken out, cooled slowly to 100° C. for 2 hours and further to 60° C. for 2 hours and then allowed to cool to room temperature, followed by grinding into particles to give a crosslinked polyester (C12-1).

The crosslinked polyester (C12-1) had a softening point of 143° C., an acid value of 27, a hydroxyl value of 16, a Tg of 57° C., an Mn of 1,550, an Mp of 4,050 and a THF-insoluble matter content of 37%. The amount of heat absorbed (Q) as determined by DSC measurement was 5.2 mJ/mg, and the L value was 12.1. This product was used as a resin for toner binders (T5) according to the invention.

EXAMPLE 6

Synthesis of a Linear Polyester (C11)

A reaction vessel equipped with a condenser, stirrer and nitrogen inlet tube was charged with 400 parts of bisphenol A-PO (2 moles) adduct, 280 parts of bisphenol A-PO (3 moles) adduct, 115 parts of terephthalic acid, 120 parts of isophthalic acid, 15 parts of maleic anhydride, and 2 parts of potassium titanyl oxalate as a polycondensation catalyst, and the reaction was carried out under a nitrogen stream at 220° C. for 10 hours while distilling off the byproduct water. Then, the reaction was further allowed to proceed under reduced pressure (5 to 20 mm Hg) and, when the acid value arrived at 2 or a lower level, the reaction mixture was cooled to 180° C., 25 parts of trimellitic anhydride was added, and the reaction was allowed to proceed at ordinary pressure in an enclosed space for 2 hours. Then, the product was taken out, cooled slowly to 100° C. for 2 hours and further to 60° C. for 2 hours and then allowed to cool to room temperature, followed by grinding into particles to give a linear polyester (C11-1).

(C11-1) contained no THF-insoluble matter and had a softening point of 95° C., an acid value of 17, a hydroxyl value of 33, a Tg of 60° C., an Mn of 2,120, and an Mp of 5,500. The amount of heat absorbed (Q) as determined by DSC measurement was 3.5 mJ/mg, and the L value was 8.8.

Synthesis of a Crosslinked Modified Polyester (C22)

A reaction vessel equipped with a condenser, stirrer and nitrogen inlet tube was charged with 300 parts of bisphenol A-EO (2 moles) adduct, 82 parts of bisphenol A-PO (2 moles) adduct, 310 parts of bisphenol A-PO (3 moles) adduct, 65 parts of phenol novolak (average degree of polymerization: about 5)-PO (5 moles) adduct, 55 parts of isophthalic acid, 165 parts of terephthalic acid, 25 parts of maleic anhydride, and 2.0 parts of dibutyltin oxide as a polycondensation catalyst, and the reaction was carried out under a nitrogen stream at 230° C. for 10 hours while distilling off the byproduct water. Then, the reaction was further allowed to proceed under reduced pressure (5 to 20 mm Hg). When the acid value arrived at 2 or a lower level, the reaction mixture was cooled to 180° C., 68 parts of trimellitic anhydride was added, and the reaction was then allowed to proceed at ordinary pressure for 1 hour and then under reduced pressure (20 to 40 mm Hg). When the softening point arrived at 115° C. (the acid value was 30), 25 parts of bisphenol A diglycidyl ether was added, the reaction was further allowed to proceed and, when the softening point arrived at 135° C., the product was taken out, cooled slowly to 100° C. for 2 hours and further to 60° C. for 2 hours, then allowed to cool to room temperature, and ground to give a crosslinked modified polyester (C22-2).

(C22-2) had a softening point of 142° C., an acid value of 13, a hydroxyl value of 32, a Tg of 57° C., an Mn of 3,070, an Mp of 5,950, and a THF-insoluble matter content of 34%. The amount of heat absorbed (Q) as determined by DSC measurement was 4.2 mJ/mg, and the L value was 9.8.

Compounding of a Resin for Toner Binders

A resin for toner binders (T6) according to the invention was prepared by subjecting 500 parts of (C11-1) and 500 parts of (C22-2) to powder mixing.

EXAMPLE 7

A resin for toner binders (T7) according to the invention was obtained in the same manner as in Example 2 except that a crosslinked modified polyester (C22-3) obtained by following the procedure for synthesizing (A2) in the same manner except that ethylene glycol diglycidyl ether was used at an addition level of 15 parts in lieu of 20 parts, that the product was taken out when the softening point arrived at 135° C., cooled slowly to 100° C. for 2 hours and further to 60° C. for 2 hours and then allowed to cool to room temperature, followed by grinding was used in lieu of the polyester (A2). The polyester (C22-3) had a softening point of 144° C., an acid value of 19, a hydroxyl value of 35, a Tg of 64° C., an Mn of 3,800, an Mp of 6,120, and a THF-insoluble matter content of 35%. The amount of heat absorbed (Q) as determined by DSC measurement was 6.7 mJ/mg, and the L value was 18.6. As for (B2), the amount of heat absorbed (Q) as determined by DSC measurement was 0.2 mJ/mg, and the L value was 0.5.

COMPARATIVE EXAMPLE 3

A crosslinked polyester for comparison (RC-1) was obtained by following the reaction procedure of Example 5 in the same manner except that when the softening point arrived at 145° C., the product was taken out using a belt molding machine and cooled rapidly to 30° C. for 5 minutes, followed by grinding.

(RC-1) had a softening point of 144° C., an acid value of 28, a hydroxyl value of 18, a Tg of 58° C., an Mn of 1,650, an Mp of 4,150, and a THF-insoluble matter content of 25%. The amount of heat absorbed (Q) as determined by DSC measurement was 0.1 mJ/mg, and the L value was 0.2. This was used as a resin for toner binders for comparison (RT3).

EVALUATION EXAMPLE 1

For each of the resins for toner binders (T1) to (T7) of the invention and the comparative resins for toner binders (RT1) to (RT3), toner preparation was carried out using 100 parts of the resin for toner binders, 7 parts of carbon black MA-100 (product of Mitsubishi Chemical Corp.), 2 parts of Viscol 550P (product of Sanyo Chemical Industries Ltd.) and 1 part of the charge control agent T-77 (product of Hodogaya Chemical Co., Ltd.) by the method mentioned below.

First, the above components/ingredients were premixed together using a Henschel mixer [FM10B, product of Mitsui Miike Kakoki], and the mixture was kneaded in a twin-screw extruder [PCM-30, product of Ikegai Ltd.]. The mixture was then finely ground using a supersonic jet mill Labo jet [product of Nippon Pneumatic Mfg. Co.], followed by classification using an airflow separator [MDS-I, product of Nippon Pneumatic Mfg. Co.] to give toner particles with a particle diameter D50 of 8 μm. Then, 0.5 part of colloidal silica [Aerosil R972, product of Nippon Aerosil Co., Ltd.] was admixed with 100 parts of the toner particles in a sample mill. In this way, toners (T1) to (T7) and comparative toners (RT1) to (RT3) were obtained.

The results of evaluations of (T1) to (T7) and (RT1) to (RT3) as made by the following evaluation methods are shown in Table 1.

(1) Minimal Fixing Temperature (MFT)—1

Unfixed images developed on a commercial copier (AR 5030; product of Sharp Corp.) were evaluated using the fixing unit of the commercial copier (AR 5030; product of Sharp Corp.). The fixing roller temperature at which the residual image density after rubbing of the fixed image with a pad amounted to at least 70% was recorded as the minimal fixing temperature.

(2) Hot Offset Occurrence Temperature (HOT)—1

Fixation and evaluation were performed in the same manner as in the above-mentioned MFT evaluation, and the occurrence or nonoccurrence of hot offset onto fixed images was evaluated by the eye. The fixing roller temperature at which hot offset occurred was recorded as the hot offset occurrence temperature.

(3) Pigment Dispersibility—1

Each toner was measured for dielectric loss tangent (tan δ), and this was employed as an indicator of pigment dispersibility.

Evaluation Criteria

Fine: tan δ: not more than 10

Fair: tan δ: from 10 to 30

Poor: tan δ: not less than 30

Dielectric Loss Tangent Measurement Conditions

Apparatus: Ando Electric Co., Ltd. model TR-1100 dielectric loss measuring apparatus Electrodes: Ando Electric Co., Ltd. model SE-43 powder electrodes Measurement Frequency: 1 kHz (4) Toner Fluidity—1

The aerated bulk density of each toner was measured with Powder Tester manufactured by Hosokawa Micron Corp., and the toner fluidity was determined based on the following criteria. "Fair" and better levels of toner fluidity are within a practical use range.

| Aerated bulk density | Toner fluidity |
|---|---|
| 36 g/100 ml or more: | Excellent |
| 33 to 36: | Fine |
| 30 to 33: | Fair |
| 27 to 30: | Inferior |
| less than 27: | Poor |

(5) Developer Behavior—1

Five arbitrarily selected sites of each allover solid image fixed in the same manner as in the above-mentioned MFT evaluation were measured for image density using a Macbeth reflection densitometer (product of Macbeth), and the developer behavior was evaluated based on the mean of the measured values according to the following criteria:

| Developer behavior Image density | Developer behavior |
|---|---|
| 1.40 or more: | Excellent |
| 1.30 to 1.40: | Fine |
| 1.00 to 1.30: | Fair |
| less than 1.00: | Poor |

EVALUATION EXAMPLE 2

For each of the resins for toner binders (T1) to (T7) according to the invention and the comparative resins for toner binders(RT1) to (RT3), 100 parts of the resin for toner binders was premixed with 8 parts of carbon black MA-100 (product of Mitsubishi Chemical Corp.), 5 parts of Fischer-Tropsch wax (Paraflint H1) and 1 part of the charge control agent T-77 (product of Hodogaya Chemical Co., Ltd.) using a Henschel mixer (FM10B, product of Mitsui Miike Kakoki), and the mixture was kneaded in a twin-screw extruder (PCM-30, product of Ikegai Ltd.). The mixture was then finely ground using a supersonic jet mill Labo jet (product of Nippon Pneumatic Mfg. Co.), followed by classification using an airflow separator (MDS-I, product of Nippon Pneumatic Mfg. Co.) to give toner particles with a particle diameter D50 of 9 μm. Then, 0.3 parts of colloidal silica (Aerosil R972, product of Nippon Aerosil Co., Ltd.) was admixed with 100 parts of the toner particles in a sample mill. In this way, toners (T1) to (T7) and comparative toners (RT1) to (RT3) were obtained.

The results of evaluations of (T1) to (T7) and (RT1) to (RT3) as made by the following evaluation methods are shown in Table 2.

EVALUATION METHODS (1) Minimal Fixing Temperature (MFT)—2

A two-component developer for the evaluation was prepared by uniformly mixing up 30 parts of each toner and 800 parts of a ferrite carrier (F-150; product of Powdertech Co., Ltd.). Unfixed images developed on a commercial copier (AR 5030; product of Sharp Corp.) using the developer were fixed at a process speed of 145 mm/sec on a fixing machine prepared by modifying the fixing unit of a commercial copier (SF 8400A; product of Sharp Corp.) so that the hot roller temperature might be varied. The fixing roller temperature at which the residual image density after rubbing of the fixed image with a pad amounted to at least 70% was recorded as the minimal fixing temperature.

(2) Hot Offset Occurrence Temperature (HOT)—2

Fixation and evaluation were performed in the same manner as in the above-mentioned MFT evaluation, and the occurrence or nonoccurrence of hot offset onto fixed images was evaluated by the eye. The fixing roller temperature at which hot offset occurred was recorded as the hot offset occurrence temperature.

(3) Pigment Dispersibility—2

The same measurement method and evaluation criteria as in Evaluation Example 1 were used.

(4) Toner Fluidity—2

The same measurement method and evaluation criteria as in Evaluation Example 1 were used.

(5) Developer Behavior—2

The same measurement method and evaluation criteria as in Evaluation Example 1 were used.

In Table 1 and Table 2, in which the evaluation results are shown, T1 to T3 are the examples concerned with the first aspect of the invention, RT1 and RT2 are comparative examples, T4 to T7 are the examples concerned with the second aspect of the invention, and RT3 is a comparative example. T6 and T7 serve also as examples concerned with the first aspect of the invention.

TABLE 1

| | T1 | T2 | T3 | RT1 | RT2 | T4 | T5 | T6 | T7 | RT3 |
|---|---|---|---|---|---|---|---|---|---|---|
| MFT-1 | 140 | 140 | 135 | 145 | 120 | 140 | 140 | 140 | 135 | 140 |
| HOT-1 | 230 | >240 | 240 | 220 | 180 | 235 | 230 | 240 | >240 | 215 |
| Pigment dispersibility-1 | Fine | Fine | Fine | Poor | Fair | Fine | Fine | Fine | Fine | Fine |
| Toner fluidity-1 | Excellent | Excellent | Excellent | Fair | Poor | Excellent | Excellent | Excellent | Excellent | Fine |
| Developer behavior-1 | Fine | Fine | Fine | Poor | Fair | Fine | Fine | Excellent | Excellent | Fine |

TABLE 2

| | T1 | T2 | T3 | RT1 | RT2 | T4 | T5 | T6 | T7 | RT3 |
|---|---|---|---|---|---|---|---|---|---|---|
| MFT-2 | 130 | 135 | 130 | 135 | 120 | 135 | 135 | 130 | 130 | 135 |
| HOT-2 | 230 | 230 | 230 | 215 | 175 | 230 | 230 | 235 | 235 | 210 |
| Pigment dispersibility-2 | Fine | Fine | Fine | Fair | Poor | Fine | Fine | Fine | Fine | Fine |
| Toner fluidity-2 | Excellent | Excellent | Fine | Excellent | Poor | Excellent | Excellent | Excellent | Excellent | Poor |
| Developer behavior-2 | Fine | Fine | Fine | Fair | Fair | Fine | Fine | Excellent | Excellent | Fine |

From Table 1 and Table 2, it is evident that the toners prepared by using the resins for toner binders according to the invention are excellent in developer behavior, toner fluidity, low temperature fixability, and anti-hot offset property.

INDUSTRIAL APPLICABILITY

The resins for toner binders of the invention have the following effects.

1. They are excellent in developer behavior.
2. They are excellent in toner fluidity.
3. They are excellent in both low temperature fixability and anti-hot offset property.
4. They are excellent in pigment dispersibility.

The invention claimed is:

1. A resin for toner binders, which comprises a blend of polyester resins (A) and (B), wherein transesterification between the resins is prevented and wherein the weight ratio between (A) and (B) is 70:30 to 20:80, said resin (A) being a crosslinked modified polyester resin consisting of the reaction product from a crosslinked polyester resin (a) and a polyepoxide (c) and said resin (B) being an acid anhydride-modified linear polyester resin consisting of the reaction product from a linear polyester resin (b) and an acid anhydride (r).

2. The resin according to claim 1, wherein (a) is a resin constituted of a dicarboxylic acid and diol, together with a tri- or further basic polycarboxylic acid and/or a tri- or further hydric polyol and (b) is a resin constituted of a dicarboxylic acid and a diol.

3. The resin according to claim 1, wherein (r) amounts to 1 to 30 mole % in the total polycarboxylic acid constituting (B).

4. The resin according to claim 1, wherein (c) has a number of epoxy groups per molecule of 2 to 8 and an epoxy equivalent of 50 to 500 g/eq.

5. The resin according to claim 1, wherein (A) has a softening point of 120 to 200° C. and (B) has a softening point of 80 to 120° C.

6. The resin according to claim 1, wherein (A) has an acid value of 0 to 40 mg KOH/g and (B) has an acid value of 1 to 50 mg KOH/g.

7. The resin according to claim 1, wherein (A) has, or (A) and (B) each independently has, a value, falling within the range of 1 to 30, of L as calculated from the amount of heat absorbed (Q) corresponding to the endothermic peak occurring on the higher temperature side of the glass transition-due stepwise change in a DSC curve as obtained by measurement with a differential scanning calorimeter upon the first temperature raising and from the glass transition temperature (Tg) according to the formula (I):

$$L=(Q\times 100)/(100-Tg) \quad \text{(I)}$$

where Q is in mJ/mg, and Tg in ° C.

8. A polyester resin-based resin for toner binders, which comprises 25 to 100% by weight of a polyester resin (C) comprising a bisphenol-alkylene oxide adduct, wherein the number of moles of alkylene oxide is 2 to 30 per mole of bisphenol, in an amount of not less than 91 mole % based on the total polyol constituting said polyester resin (C) and wherein said polyester resin (C) has a value, falling within the range of 1 to 30, of L as calculated from the amount of heat absorbed (Q) corresponding to the endothermic peak occurring on the higher temperature side of the glass transition-due stepwise change in a DSC curve as obtained by measurement with a differential scanning calorimeter upon the first temperature raising and from the glass transition temperature (Tg) according to the formula (I) given below, and 0 to 75% by weight of a polyester resin (D) other than (C):

$$L=(Q\times 100)/(100-Tg) \quad \text{(I)}$$

where Q is in mJ/mg, and Tg in ° C.

9. The resin according to claim 8, wherein (C) is a polyester resin obtainable by reacting a polyol comprising the bisphenol-alkylene oxide adduct in an amount of not less than 91 mole % based on the total amount of the polyol and polycarboxylic acid with each other, optionally together with a polyepoxide (c) and cooling the reaction product slowly from the temperature at the time of completion of the reaction to Tg over at least 30 minutes.

10. The resin according to claim 8, wherein (C) is a crosslinked polyester resin (C12) constituted of a dicarboxylic acid, a diol, and a tri- or further basic polycarboxylic acid and/or a tri- or further hydric polyol, and/or a crosslinked modified polyester resin (C22) resulting from reaction of (C12) with a polyepoxide (c), wherein the diol in the crosslinked polyester resin (C12) comprises the bisphenol-alkylene oxide adduct in an amount of not less than 91 mole % based on the total amount of the polyol components.

11. The resin according to claim 8, wherein (D) is an acid anhydride-modified linear polyester resin.

12. The resin according to claim 1, wherein (A) has a tetrahydrofuran-insoluble matter content of 5 to 70% by weight.

13. The resin according to claim 1, wherein (A) and (B), occur as a result of powder mixing.

14. The resin according to claim 1, which is intended for use in monochrome copiers.

15. A resin composition for toner binders, which comprises the resin for toner binders according to claim 1 and at least one mold release agent selected from the group consisting of carnauba wax, Fischer-Tropsch waxes, paraffin waxes and polyolefin waxes.

16. A toner composition, which comprises a resin for toner binders comprising a blend of polyester resins (A) and (B), wherein transesterification between the resins is prevented, and a colorant, if necessary together with at least one agent selected from among mold release agents and charge control agents, said (A) being a crosslinked modified polyester resin consisting of the reaction product from a crosslinked polyester resin (a) and a polyepoxide (c) and said (B) being an acid anhydride-modified linear polyester resin consisting of the reaction product from a linear polyester resin (b) and an acid anhydride (r).

17. A toner composition which comprises a polyester-based resin for toner binders and a colorant, optionally together with at least one agent selected from among mold release agents and charge control agents, said resin for toner binders comprising 25 to 100% by weight of a polyester resin (C) comprising a bisphenol-alkylene oxide adduct, wherein the number of moles of alkylene oxide is 2 to 30 per mole of bisphenol, in an amount of not less than 91 mole % based on the total polyol constituting said polyester resin (C) and 0 to 75% by weight of a polyester resin (D) other than (C), in which (C) has a value, falling within the range of 1 to 30, of L as calculated from the amount of heat absorbed (Q) corresponding to the endothermic peak occurring on the higher temperature side of the glass transition-due stepwise change in a DSC curve as obtained by measurement with a differential scanning calorimeter upon the first temperature raising and from the glass transition temperature (Tg) according to the formula (I):

$$L=(Q\times 100)/(100-Tg) \quad (I)$$

where Q is in mJ/mg, and Tg in ° C.

18. The resin according to claim 8, wherein (C) has a tetrahydrofuran-insoluble matter content of 5 to 70% by weight.

19. The resin according to claim 8, wherein (C) and (D) occur as a result of powder mixing.

20. The resin according to claim 8, which is intended for use in monochrome copiers.

21. A resin composition for toner binders, which comprises the resin for toner binders according to claim 8 and at least one mold release agent selected from the group consisting of carnauba wax, Fischer-Tropsch waxes, paraffin waxes and polyolefin waxes.

* * * * *